United States Patent [19]
Reitemeyer et al.

[11] 4,084,933
[45] Apr. 18, 1978

[54] APPARATUS FOR THE SEALING OF THE INTERIOR OF SYNTHETIC-RESIN TUBES DURING EXTRUSION

[75] Inventors: Paul Reitemeyer; Hans Reifenhauser, both of Troisdorf-Bergheim, Germany

[73] Assignee: Reifenhauser KG, Troisdorf, Germany

[21] Appl. No.: 747,185

[22] Filed: Dec. 3, 1976

[30] Foreign Application Priority Data

Dec. 4, 1975 Germany .................................. 2554551

[51] Int. Cl.² .................................................. B29D 23/04
[52] U.S. Cl. ......................................... 425/467; 277/34.3; 425/377; 425/380
[58] Field of Search ................... 277/34, 34.3, 34.6; 285/97; 425/72 R, 326.1, 113, 192 R, 262, 325, 380, 381, 392, 393, 404, 445, 446, 460, 377, 355; 72/264; 264/95, 209

[56] References Cited

U.S. PATENT DOCUMENTS

| | | | |
|---|---|---|---|
| 2,814,071 | 11/1957 | Allan et al. | 264/209 X |
| 3,388,425 | 6/1968 | Detter | 425/113 X |
| 3,711,232 | 1/1973 | Van Zon | 425/393 X |
| 3,784,345 | 1/1974 | Wissinger et al. | 425/380 X |
| 3,814,564 | 6/1974 | Streng et al. | 425/326.1 X |

*Primary Examiner*—Francis S. Husar
*Assistant Examiner*—Mark Rosenbaum
*Attorney, Agent, or Firm*—Karl F. Ross

[57] ABSTRACT

The synthetic-resin tube emerging from an extrusion die is internally sealed by a pair of sealing members having inflatable peripheries and connected to flexible members running back through the die so that one of the seals can be drawn toward the die while the other is entrained with the tube away from the latter and vice versa.

6 Claims, 2 Drawing Figures

APPARATUS FOR THE SEALING OF THE INTERIOR OF SYNTHETIC-RESIN TUBES DURING EXTRUSION

FIELD OF THE INVENTION

The present invention relates to an apparatus for the sealing of the interior of synthetic-resin tubes during the extrusion thereof.

BACKGROUND OF THE INVENTION

It is known to stabilize synthetic-resin tubes upon their extrusion from a die by sealing the same to maintain a superatmospheric pressure in the space between the die and the sealed portion to support the otherwise flacid tube wall until solidification, hardening, curing, or cooling of this wall has been completed.

As is known in the art and has been described in "EXTRUDIEREN VON PROFILEN UND ROHREN" (VD1-Verlag 1974 S. 98, 99), the conventional seals or plugs for the interiors of extruded tubes can be connected to the region of the extrusion die by a tractive element which enables the tube to pass by the plug. Such systems have considerable disadvantages, mainly because of the significant wear to which the seal or plug is subject. This is especially the case when large-bore or large-caliber pipe is made at extrusion speeds between 3 and 15 cm/minute.

To reduce the wear in this manner, it is known to provide a plurality of such plugs connected one after the other.

Another way of sealing the interior of the tube is to squeeze the same shut at a location remote from the extrusion die. This process is only effective if pipes of limited length are to be made and has been found to severely limit the production or output because the squeezed portion must be cut from the tube and discarded. The squeezing process itself is time consuming and labor consuming.

OBJECTS OF THE INVENTION

It is, therefore, an object of the invention to provide an improved apparatus for the extrusion of pipe or tubes, especially large-caliber synthetic-resin tubes at high production rates, whereby the aforementioned disadvantages are obviated.

It is another object of the invention to provide an improved apparatus for sealing the interior, during extrusion of a synthetic-resin tube so that the pressure within the interior thereof can sustain the wall of the tube against its tendency to collapse.

Still another object of the invention is to provide low cost and efficient means for the sealing of the interior of an extruded tube, whereby the problem of wear is obviated.

It is also an object of the invention to provide an apparatus for the extrusion of synthetic-resin tubing and/or the sealing of extruded synthetic-resin tubing, which is economical, efficient and effective independently of the extrusion speed and the length of pipe to be produced.

SUMMARY OF THE INVENTION

These objects and other which will become apparent hereinafter are attained, in accordance with the present invention, by a sealing system which comprises a pair of plugs axially spaced downstream of an extrusion head and disposed within the extruded synthetic-resin pipe or tube, the plugs having peripheral portions adapted, upon actuation, to sealingly engage the inner wall of the pipe, thereby causing the latter to entrain the plug with the advance of the extruded pipe. At least the most downstream of these plugs is sealed when it engages the inner wall of the extruded pipe so that the pressure upstream thereof is always superatmospheric.

The two plugs are connected to tractive elements which are provided with means for alternatingly drawing the plug toward the extrusion head or die or enabling the plug to advance with the extruded pipe.

The activation means for the sealing engagement of the peripheries of the plugs with the inner wall of the pipe can be conduits or ducts delivering compressed air to annular or toroidal bladders forming these peripheries.

According to the invention, one of the plugs, e.g. the plug proximal to the extrusion die, is brought into its extreme upstream position (usually adjacent the die) and is activated, i.e. caused to expand so that its periphery engages the inner wall of the extruded pipe. This plug is thus entrained with the pipe as it advances from the extrusion die to or along the pipe-takeup means, e.g. a conveyor,. During this advance of the plug, its cable or tractive element is paid out from the region of the die.

Meanwhile the tractive element of the other plug, which has reached its extreme downstream position, is retracted while the periphery of this downstream plug is disengaged from the inner wall of the extruded pipe so that the downstream plug can be returned against the direction of movement of the extruded pipe until it reaches its extreme upstream position adjacent the extreme downstream position of the first plug.

The first plug is retracted via its flexible cable or tractive element and the periphery of the second plug is expanded into sealing engagement with the wall of the pipe and advances with the latter.

The plugs are said to be activated when they are expanded to engage the inner wall of the pipe and to be deactivated when their peripheries are contracted and thus decoupled from the wall.

As noted, the sealing means on the plugs are inflatable annular bladders or tubes, vehicle-tire tubes, which are connected to the activating duct and surround the plugs as rings along the peripheries of the duct-like bodies constituting the plugs.

According to one aspect of the invention, the plugs can be provided with separate actuating means for activating the respective tubular bladder and retracting or paying out the respective flexible elements. The latter means can include windlasses upon which the respective activating ducts (flexible hose) and cable can be reeled.

In accordance with another aspect of the invention, the plugs are connected together by a tractive element which passes around a direction-changing device, e.g. a pulley, so that the retraction of one plug will always correspond to the advance of the other and both the forward and return displacements of the plugs can be brought about by the entrainment of the activated plug with the pipe.

The apparatus of the present invention can be provided with the cable and hose drums ahead of the head or die. If the apparatus has a pipe withdrawal or takeup conveyor or like means, it is preferred that the conveyors be operated synchronously with the cable and hose drums.

The system of the present invention has numerous advantages. Firstly, the wear problems hitherto encountered are completely eliminated since there is little or no relative movement between the wall of the extruded pipe and the peripheries of activated plugs. The deactivated plug during this period does not engage the extruded pipe and hence suffers no wear.

Synthetic-resin pipes of any desired length can be produced and infact pipe production can be continuous, i.e. without interruption of production. In the usual case, there is no difficulty with passing the tractive elements and hoses through the extrusion or molding head. Furthermore, we can provide, if desired, an outer supporting sleeve around the pipe so that the latter will not be deformed materially outwardly or can provide a ring which will surround the exterior wall of the pipe in the same plane as the plugs and which is moveable together therewith upon engagement with the extruded pipe.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
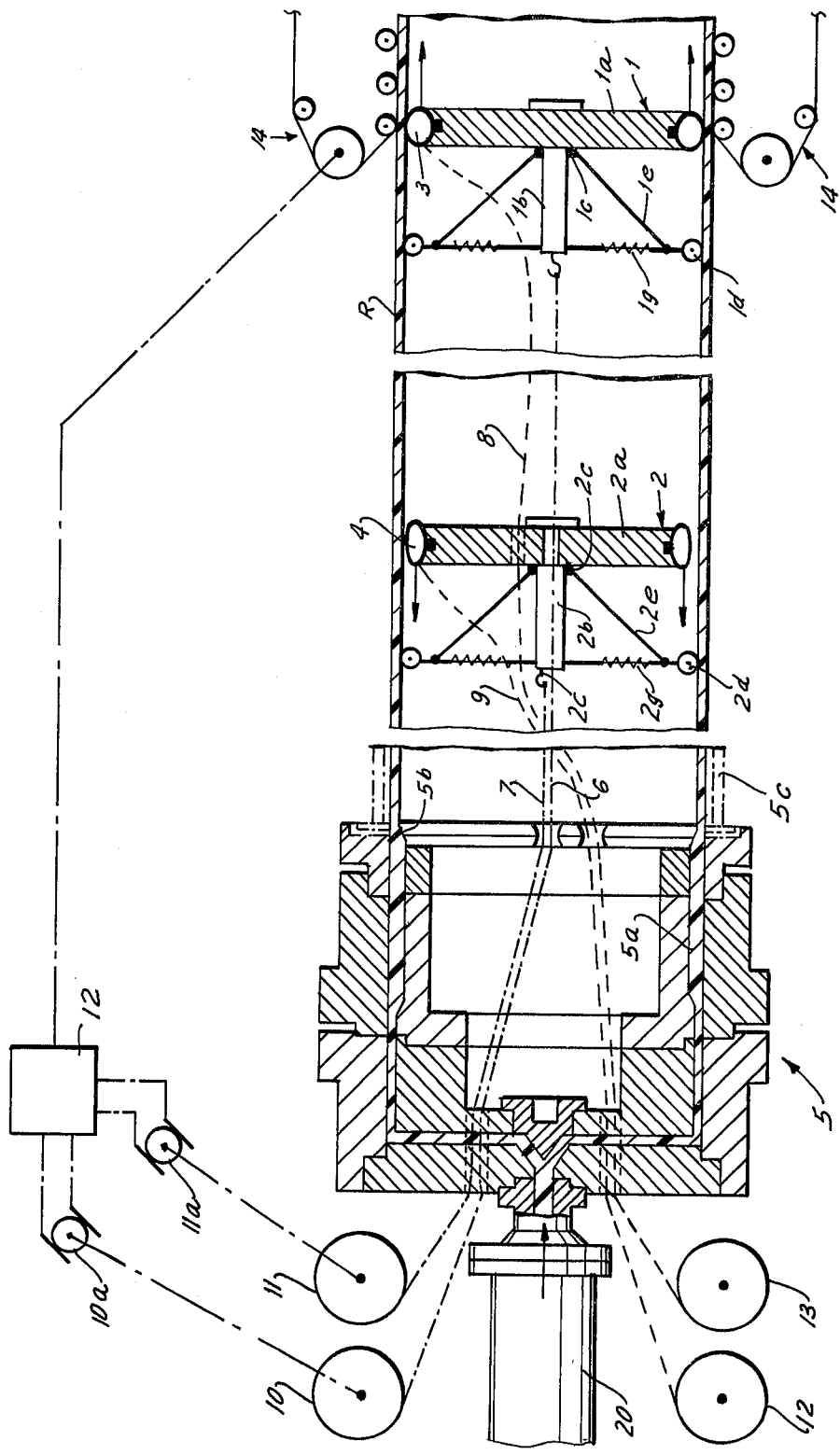
FIG. 1 is a diagrammatic axial cross-sectional view of an apparatus embodying the invention.
Figure 2:
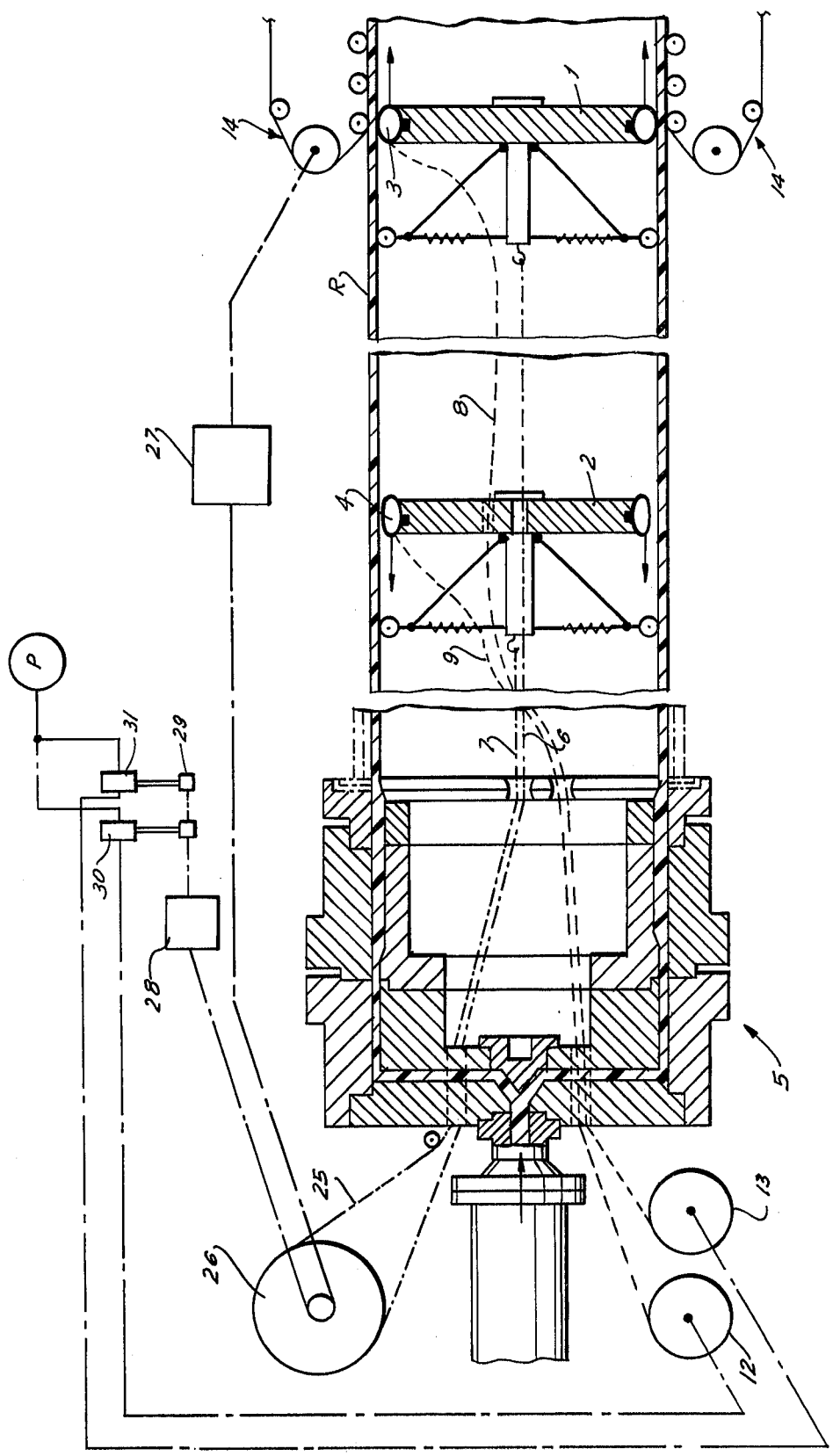
FIG. 2 is a view similar to FIG. 1 illustrating another embodiment of the device.

In FIG. 1 we have shown a plasticizing and extrusion unit 20 which feeds the thermoplastic synthetic-resin material in a hot flowable state into an extrusion die generally represented at 5. Of course, if injection molding is employed for producing the tube or pipe, the unit 20 can represent an injection-molding apparatus and die 5 can represent an injection-molding die. The die 5 can have, as shown, a channel, 5a from which the extruded pipe R emerges past a calibrating duct 5b. A wall 5c in the form of a sleeve may surround the extruded tube 3 and can support the latter against any outward forces. Alternatively, a ring may be mounted movably outside the tube for supporting same against any outward force by the plugs 1 and 2 whose function will be described in greater detail hereinafter.

The plugs 1 and 2 are axially spaced so that plug 2 constitutes the upstream plug and plug 1 the downstream plug. Each plug 1, 2 is provided with a diskshaped body 1a, 2a having a central member 1b, 2b provided with a hook 1c, 2c engaging a respective cable 6, 7 serving as the respective tractive element. Along the periphery of each body 1a, 2a, there is provided a respective inflatable bladder 3, 4 of annular configuration, the bladder being substantially toroidal when inflated through respective hoses 8, 9. To prevent the plugs from canting within the extruded tube or pipe R, the plugs each are formed with a plurality of angularly equispaced rollers 1d, 2d, mounted upon arms 1e, 2e pivoted to the body 1a, 2a at 1f, 2f respectively. These arm 1e, 2e are biased outwardly with light pressure by radially effective springs 1g, 2g. Downstream of the die 5, at some distance therefrom, there is provided a pipe-withdrawal mechanism comprising a pair of conveyor belts 14.

Upstream of the die 5, there is provided a pair of windlasses or cable drums 10, 11 which may be operated by respective motor 10a and 11a from a controller 12 which synchronously drive the conveyors 14 and serve to alternately energize the motors 10a and 11a. The cables 6 and 7 are respectively reeled onto the drums 10, 11.

The flexible hoses 8, 9 are reeled onto the hose drums 12, 13 which can also be operated by motors 10a, 11a synchronously with the takeoff device 14.

As can be seen from FIG. 1, the plug 2 is retracted by the drum 11 as the plug 1 is advanced, dragging its cable 6 along. The cable 6 passes through an opening in the plug 2. To enable the tube R to entrain, the plug 1 along with it, the seal 3 is inflated by hose 8. The seal 4 is deflatable so that retraction of plug 2 is without any frictional engagement with the inner wall 2, in which same reference numerals are used to indicate similar elements, the cable stretches 6 and 7 for a common loop 25 around a direction changing pulley 26 which is undriven but is synchronously connected by a controller with the takeoff device 14. Through a speed-reducing transmission 28, cams 29 can be driven synchronously with the advance of the forwardly moving plug 1 or 2 and enables them to operate valves 30 and 31 which alternately supply compressed air 2 and vent the flexible hoses 8 and 9. The controller 27 permits reversal of the sense of direction of the pulley 26. If it is assumed that the valve 30 or 31 supplying the hose 3 is activated, the plug will move to the right by entrainment with the pipe.

Until the cams 29 reverse the functions of the valves 30 and 31, whereupon seals 3 will be deflated and seal 4 will be inflated. Plug 2 will then be advanced with the pipe R while plug 1 is retracted.

We claim:

1. An apparatus for the sealing of a synthetic-resin tube continuously produced at a head, said apparatus comprising a pair of axially spaced plugs receivable in such tube; respective tractive elements connected to said plugs for effecting an alternating retraction and advance of said plugs along with such tube; and means including respective conduits connected to each of said plugs for activating same to engage said plugs alternately with the inner wall of such tube.

2. The apparatus defined in claim 1 wherein each of said plugs is formed with an inflatable annular bladder along its periphery, said ducts being compressed gas ducts connected to said bladder.

3. The apparatus defined in claim 1, further comprising a mechanism ahead of said head and connected to said elements for controlling the advance and retraction of said plugs.

4. The apparatus defined in claim 3 wherein said mechanism includes a direction reversing pulley, said element forming a single flexible cable passing around said pulley.

5. The apparatus defined in claim 1, further comprising valve means connected with said ducts for alternately pressurizing same.

6. The apparatus defined in claim 1 wherein said head is an extrusion head.

* * * * *